United States Patent
Yamada et al.

(10) Patent No.: US 6,319,121 B1
(45) Date of Patent: Nov. 20, 2001

(54) IMAGE SYNTHESIS METHOD, GAMES MACHINE, AND INFORMATION STORAGE MEDIUM

(75) Inventors: Masanori Yamada; Naoki Ito, both of Yokohama; Masahiro Kimoto, Tokyo; Masamichi Abe, Uji, all of (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 08/945,506

(22) PCT Filed: Mar. 6, 1997

(86) PCT No.: PCT/JP97/00698

§ 371 Date: Oct. 28, 1997

§ 102(e) Date: Oct. 28, 1997

(30) Foreign Application Priority Data

Mar. 7, 1996 (JP) .................................................. 8-79546

(51) Int. Cl.[7] .............................. A63F 13/00; A63F 9/34; G06F 17/00; G06F 19/00
(52) U.S. Cl. .................................... 463/8; 463/7; 463/30; 463/31; 463/32; 463/36; 463/37; 463/43; 463/44; 273/148 B; 273/148 R; 273/460.1
(58) Field of Search .................................. 463/8, 47.1, 48, 463/7, 31, 32, 33, 30, 34, 35, 36, 37, 38, 39, 43, 44; 273/148 B, 640.1, 148 R; 434/308, 309, 311

(56) References Cited

U.S. PATENT DOCUMENTS

| | | | |
|---|---|---|---|
| 4,490,810 | * | 12/1984 | Hon .................................. 364/900 X |
| 4,681,548 | * | 7/1987 | Lemelson ......................... 434/311 X |
| 4,752,069 | * | 6/1988 | Okada .............................. 273/166 X |
| 4,767,335 | * | 8/1988 | Curt ................................. 434/352 X |
| 5,219,291 | * | 6/1993 | Fong et al. ....................... 434/323 X |
| 5,267,734 | * | 12/1993 | Stamper et al. ................. 273/434 X |
| 5,498,003 | * | 3/1996 | Gechter ........................... 273/434 X |
| 5,613,909 | * | 3/1997 | Stelovsky ............................ 463/1 X |
| 5,643,094 | * | 7/1997 | Macri et al. ....................... 472/92 X |
| 5,649,861 | * | 7/1997 | Okano et al. ..................... 463/30 X |
| 5,649,862 | * | 7/1997 | Sakaguchi et al. ............... 463/44 X |
| 5,720,663 | * | 2/1998 | Nakatani et al. ................. 463/23 X |

FOREIGN PATENT DOCUMENTS

| | | |
|---|---|---|
| A-4-51984 | 2/1992 | (JP) . |
| U-5-74589 | 10/1993 | (JP) . |
| A-7-148351 | 6/1995 | (JP) . |
| A-7-155463 | 6/1995 | (JP) . |

* cited by examiner

Primary Examiner—Jessica J. Harrison
Assistant Examiner—Binh-An D. Nguyen
(74) Attorney, Agent, or Firm—Oliff & Berridge, PLC (57) ABSTRACT

The objective is to provide an image synthesis method, games machine, and information storage medium which make it easy for a player to learn operating sequences that cause a game character to perform various different actions. If a training mode in which a player can practice manipulations is selected and an attack of a game character 30 hits another game character 32, a hit mark 34 is displayed at the hit location. In addition, a replay image is displayed if a replay creation condition is satisfied or if the player has performed a given manipulation. To enable the player to practice counterattacking, a game character manipulated by the computer initiates attacks at a constant timing.

14 Claims, 11 Drawing Sheets

| FRAME | REPLAY BUFFER FOR PLAYER'S GAME CHARACTER | | REPLAY BUFFER FOR ENEMY'S GAME CHARACTER | |
|---|---|---|---|---|
| | POSITION DATA | MOTION NUMBER | POSITION DATA | MOTION NUMBER |
| n | | | | |
| n+1 | NEXT POSITION DATA | NEXT MOTION NUMBER | NEXT POSITION DATA | NEXT MOTION NUMBER |
| n+2 | | | | |
| ⁝ | ⁝ | ⁝ | ⁝ | ⁝ |
| ⁝ | ⁝ | ⁝ | ⁝ | ⁝ |
| ⁝ | ⁝ | ⁝ | ⁝ | ⁝ |

FIG. 8B

FIRST FRAME → SECOND FRAME → THIRD FRAME

MOTION NUMBER 1  MOTION NUMBER 2  MOTION NUMBER 3

FIG. 8C

REPLAY BUFFER

IMAGE SYNTHESIS METHOD, GAMES MACHINE, AND INFORMATION STORAGE MEDIUM

TECHNICAL FIELD

This invention relates to an image synthesis method, a games machine, and an information storage medium.

BACKGROUND OF ART

In a fighting game or the like, a game character manipulated by a player is made to fight a game character manipulated by an opposing player (or computer) on a screen, so that the player can enjoy the game. Such a fighting game is highly popular as a game that enables players to experience the feeling of actually fighting each other.

However, the quality of the manipulation skills of each player have a huge effect on the game result in a fighting game. Particularly in a fighting game, manipulating a cross-shaped key and operating buttons of a game controller in a given sequence (a sequence in which, for instance, a left portion of the cross-shaped key is pressed before buttons A and B are pressed in sequence) usually causes the game character to perform a special technique (special action). If this special technique is successful, it is possible to inflict a great deal of damage to the opponent, so that the success or otherwise of the special technique has a large effect on the game result. Therefore, the quality of the player's manipulation skills depends on whether a special technique is smoothly performed or not.

However, the operating sequence for producing this special technique, or another action such as a counterattack or guarding, is generally complicated and it is an extremely difficult task for the player to learn this operating sequence. It is particularly difficult to memorize such operating sequences during combat with another player in normal combat mode, which is one reason why players who lack confidence in their manipulation skills are put off by this type of game.

This invention was devised in order to solve the above described technical problems, and has as its objective the provision of an image synthesis method, games machine, and information storage medium that makes it possible for a player to easily learn operating sequences for causing a game character to perform various different actions.

Disclosure of the Invention

In order to solve the above problems, this invention relates to an image synthesis method for synthesizing a game image: displaying an image of combat between a game character manipulated by a player and a game character manipulated by a computer, when a training mode is selected in order to enable the player to practice manipulations with a game controller, and displaying an image indicating a hit mark at a hit location, when an attack by one of the game characters hits the other game character.

With this aspect of the invention, a hit mark is displayed at the hit location of an attack, during a training mode in which a player can practice manipulations. The player can therefore practice game manipulations while confirming the positions of the player's own attacks or the enemy's attacks, by observing these hit marks. This makes it possible for the player to learn techniques such as attacking and defense against special techniques, both easily and quickly, enabling an increase in the interest of the game in combat mode.

The hit mark may comprise a symbol for identifying the hit location. This enables the player to perceive the hit location even quicker and more accurately.

Moreover, a guard mark may be displayed when the other game character defends against the attack. If the game character manipulated by the player is this other game character, for example, this makes it easy for the player to confirm whether or not the player's defending action has been successful. This is designed to improve the player's defensive techniques.

When the attack hits an upper area, middle area, or lower area of the other game character, a hit mark specifying that upper area, middle area, or lower area may be displayed. This makes it easy for the player to confirm whether an attack has hit the upper area, middle area, or lower area.

This invention also relates to an image synthesis method for synthesizing a game image: displaying an image of combat between a game character manipulated by a player and a game character manipulated by a computer, when a training mode is selected in order to enable the player to practice manipulations with a game controller; and displaying a replay image relating to an attack by the game character manipulated by the player against the game character manipulated by the computer, when the player selects a replay mode while in the training mode and when the attack by the game character manipulated by the player against the game character manipulated by the computer satisfies a given replay creation condition.

With this aspect of the invention, if an attack performed in training mode satisfies a given replay creation condition, a replay image relating to that attack is displayed. This enables the use of replays as a means of allowing the player to experience the results of practice.

This replay creation condition may be satisfied when the number of sequential attacks of the game character manipulated by the player exceeds a given number of times. This makes it possible to further increase the feeling of satisfaction of a player whose sequence of attacks has been successful a given number of times.

This replay creation condition may also be satisfied when an operating sequence specified by at least one input operation input by the player matches a given reference sequence. This makes it possible to further increase the feeling of satisfaction of a player whose unleashing of a special technique, or the like, has been successful.

This invention further relates to an image synthesis method for synthesizing a game image: displaying an image of combat between a game character manipulated by a player and a game character manipulated by a computer, when a training mode is selected in order to enable the player to practice manipulations with a game controller; and displaying a replay image relating to actions performed by the game character manipulated by the player and the game character manipulated by the computer before a given manipulation, when the player selects a replay mode while in this training mode and the player performs the given manipulation.

This aspect of the invention makes it possible to see a replay image of actions performed beforehand, at any time while in training mode. This makes it possible to increase the degree of freedom of replay mode, by enabling the player to enjoy a replay mode manually.

This invention further relates to an image synthesis method for synthesizing a game image: displaying an image of combat between a game character manipulated by a player and a game character manipulated by a computer, when a training mode is selected in order to enable the player to practice manipulations with a game controller; and displaying an image of an attack action performed by the game character manipulated by the computer, when the player selects a counterattack mode while in the training mode.

With this aspect of the invention, the game character manipulated by the computer initiates attacks in counterattack mode, making it possible to acquire counterattack technique efficiently.

BEST MODE FOR CARRYING OUT THE INVENTION

An embodiment of this invention will now be described with reference to the accompanying figures.

Figure 1A:
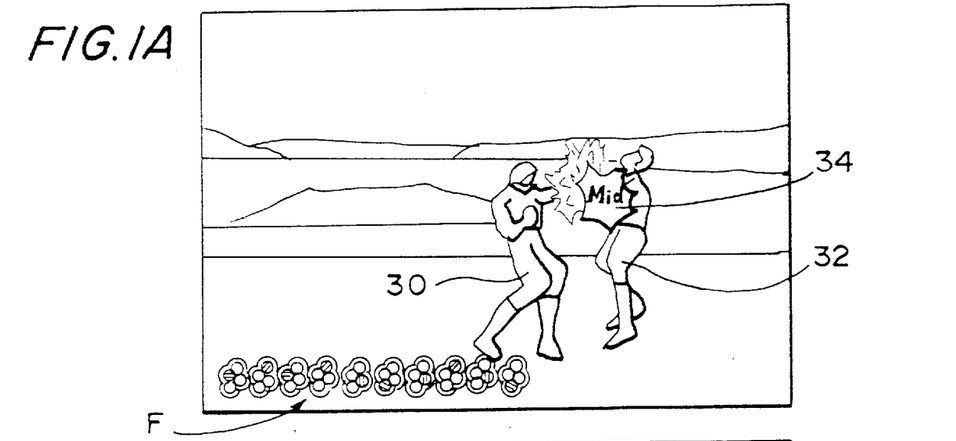
FIGS. 1A, 1B, and 1C show examples of images displayed by this embodiment.
Figure 1B:
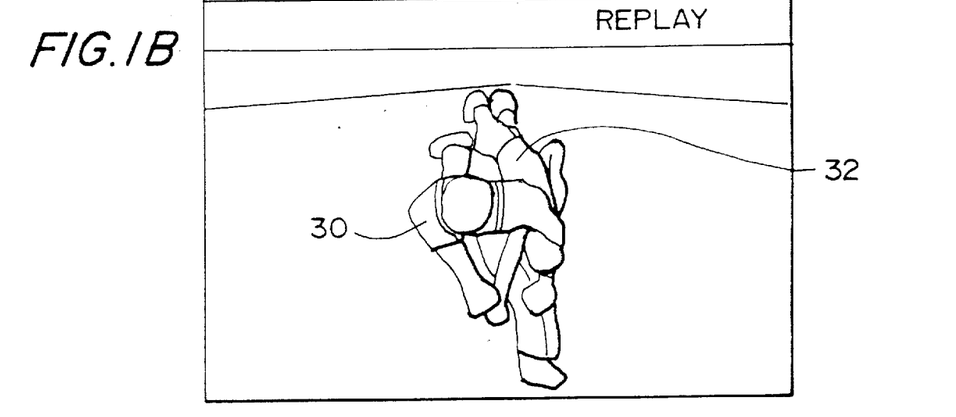
Figure 1C:
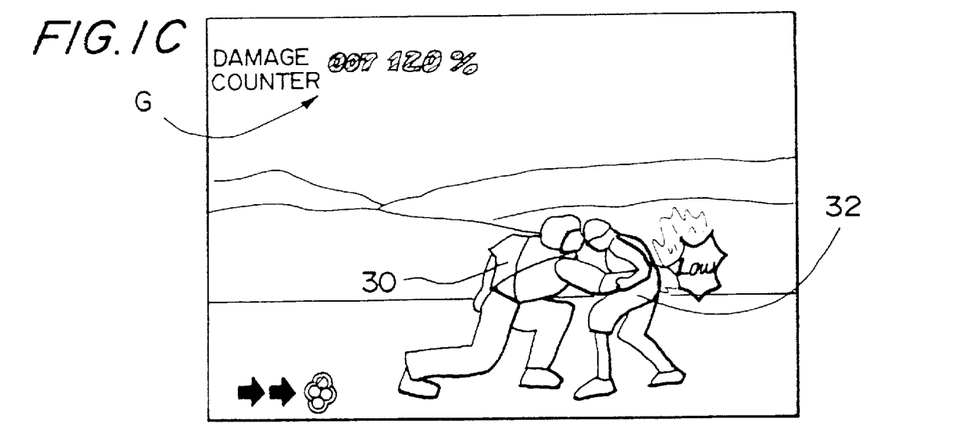
Figure 2A:
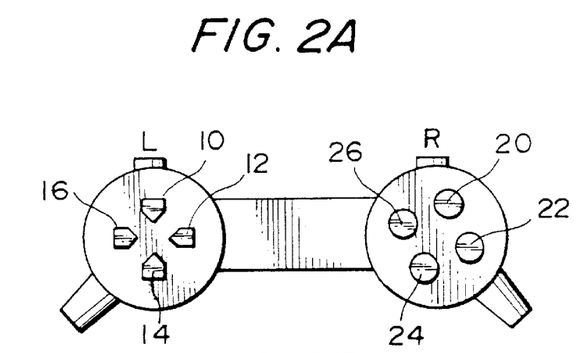
FIGS. 2A and 2B show examples of game controllers and FIG. 2C shows various identification symbols.

Examples of images displayed by this embodiment are shown in FIGS. 1A, 1B, and 1C. A game character 30 is manipulated by the player and an enemy's game character 32 is manipulated by the computer. An example of a game controller used in this embodiment is shown in FIG. 2A. Operating buttons 10, 12, 14, and 16 in FIG. 2A act as direction input means such that if, for example, one of the operating buttons 10, 12, 14, and 16 is pressed, the game character performs an operation such as jump, move to the right, crouch down, or move to the left. Furthermore, pressing operating buttons 20, 22, 24, and 26 make the game character perform actions such as punching and kicking. A guarding action can also be performed by, for example, pressing the operating button 14 or the operating buttons 14 and 16 simultaneously. Alternatively, one of the operating buttons 20, 22, 24, and 26 could be allocated for this guarding action. A start button 28 is used for actions such as starting the game and selecting a mode.

Figure 2B:
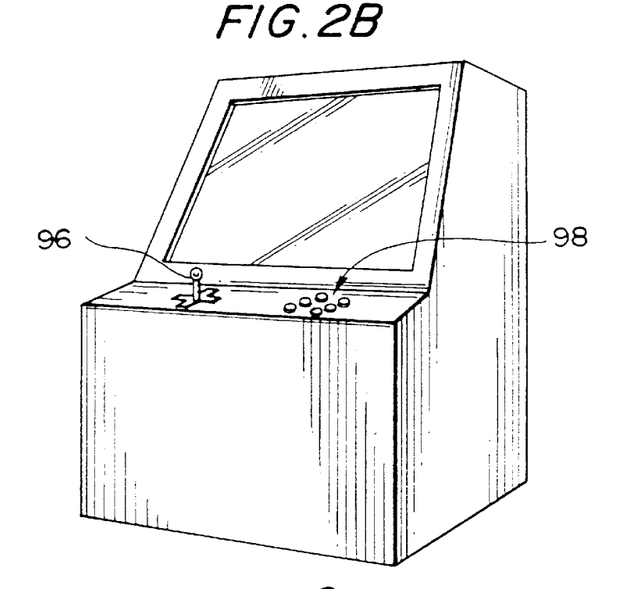

Note that the game controller shown in FIG. 2A is one that is used widely in domestic games machines, but the game controller of this invention is not limited thereto; it also comprises the game controller of an arcade games machine, such as that shown in FIG. 2B. In that case, the game operations are performed by a joystick 96, which forms a direction input means, and a group of operating buttons 98.

With this embodiment, a determination is made as to whether or not an operating sequence specified by operations that are input in sequence from the game controller matches a reference operating sequence, and, if they do match, the game character exhibits a special technique. If, for example, an operating sequence acting as reference has been specified as: "Press the operating button 12 twice in succession, then press the operating buttons 20 and 24," and the operating sequence that is input matches this reference operating sequence, including the input timing, the game character will perform the special technique corresponding to that operating sequence.

Figure 3A:
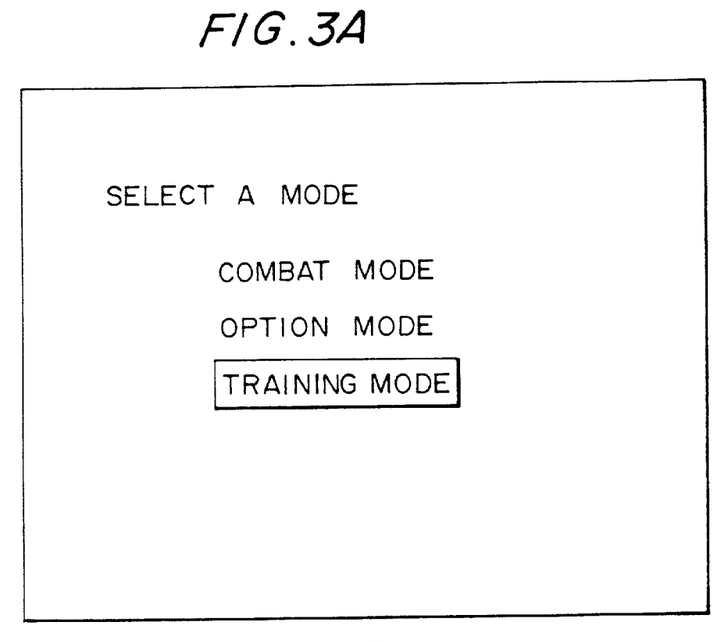
FIGS. 3A and 3B show examples of mode selection screens displayed by this embodiment.
Figure 3B:
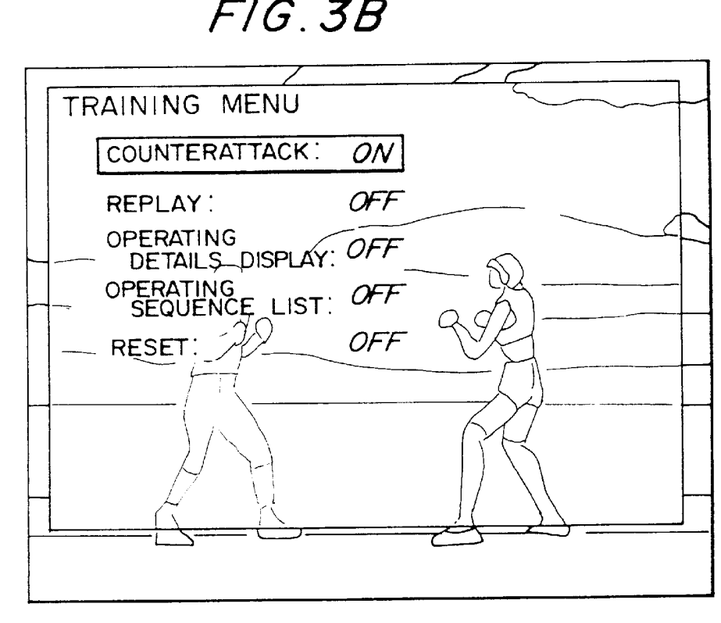

Immediately after a game starts in this embodiment, a mode selection screen such as that shown in FIG. 3A is displayed. If the player selects training mode, a training menu screen such as that shown in FIG. 3B is displayed.

This training mode is designed to allow the player to practice operations using the game controller. In training mode, images are displayed to show the game character 30 manipulated by the player fighting the enemy's game character 32 manipulated by the computer, as shown in FIG. 1A.

Figure 4A:
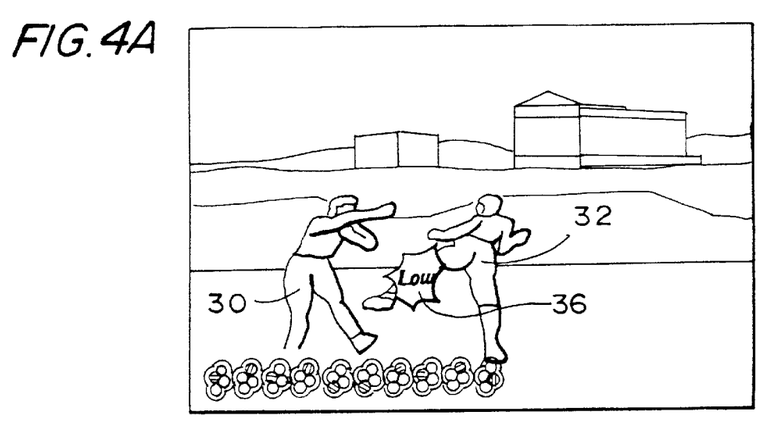
FIGS. 4A, 4B, and 4C show further examples of images displayed by this embodiment.

A first characteristic of this embodiment is the way in which, if the attack by one of the game characters hits the other game character while in training mode, a hit mark 34 is displayed at the hit location. In this case, the hit mark 34 comprises a symbol for identifying the hit location. In FIG. 1A, a punch has hit the middle area of the enemy's game character 32, so the hit mark 34 displayed at the hit location comprises the symbol "Mid," meaning "middle area." This makes it easy for the player to perceive the place on the enemy's game character 32 where the punch landed. Similarly, if a lower area of the enemy's game character 32 is hit, as shown in FIG. 4A, a hit mark 36 displayed at the hit location comprises the symbol "Low," meaning "lower area."

Figure 4B:
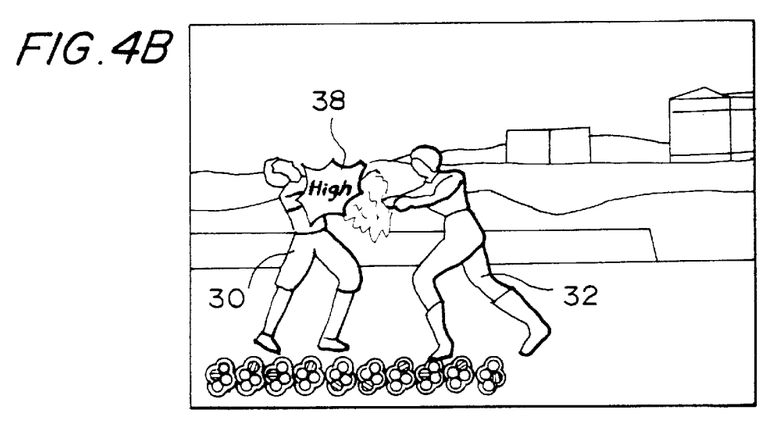
Figure 4C:
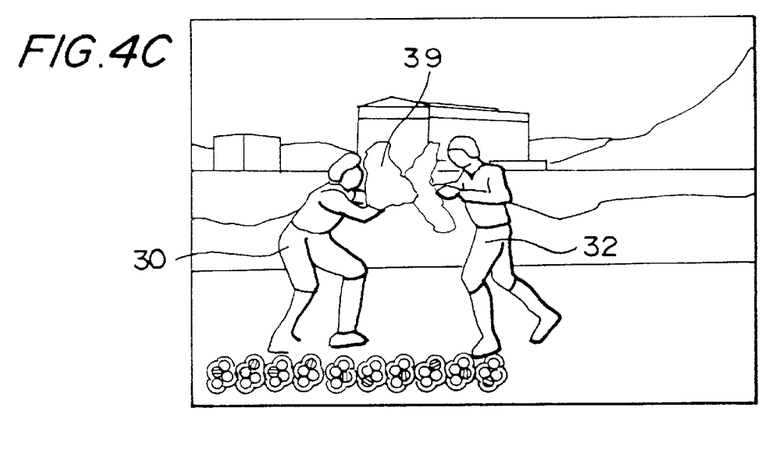

These hit marks are also displayed when the enemy's punch hits the game character 30 manipulated by the player. In FIG. 4B, the enemy's game character 32 manipulated by the computer has thrown a punch that has hit the upper area of the game character 30, so a hit mark 38 comprising the symbol "High" is displayed at the hit location. In FIG. 4C, the game character 30 manipulated by the player is performing a guarding action to dodge the attack of the enemy's game character. In this case, a guard mark 39 is displayed to inform the player that the defense against the enemy's attack was successful.

In a fighting game or the like, the quality of defensive techniques is also an important factor in determining the result of the game. For a defense to be successful, it is necessary to rapidly determine whether the enemy's attack is directed against the upper area, middle area, or lower area of the body, and perform a guarding action that is suited to the corresponding attack location. In an actual combat mode, however, the actions of the game characters are so fast, it is often not possible to instantly determine where the enemy's punch has hit. When an attack by the enemy hits the opponent in a training mode of this embodiment, a hit mark is displayed at the hit location so that the place that has been hit can be instantly perceived. Similarly, a guard mark is displayed when a defense is successful, making it possible to instantly perceive whether or not the guarding has been successful. Thus this embodiment makes it possible to provide a training mode that facilitates the task of learning a defensive techniques against the enemy's attack, enabling the appropriate and easy acquisition of complicated operating sequences. In particular, if a game character unleashes a special technique, an attack pattern is determined in which the upper area is attacked or the upper area, middle area, and lower area are attacked in sequence, for example. Therefore, if a special technique is unleashed against the enemy's game character in training mode, so that the player can learn defensive techniques while seeing the display of hit and guard marks, techniques for defending against special techniques can be acquired easily and rapidly.

Figure 5A:
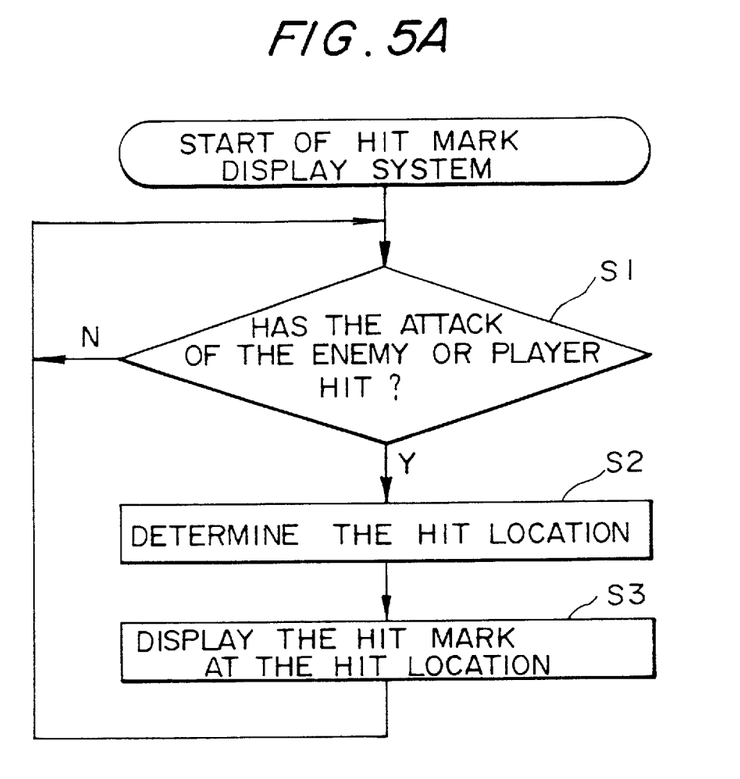
FIG. 5A is a flowchart illustrating the hit mark display processing and FIG. 5B is views illustrating the hit check.
Figure 5B:
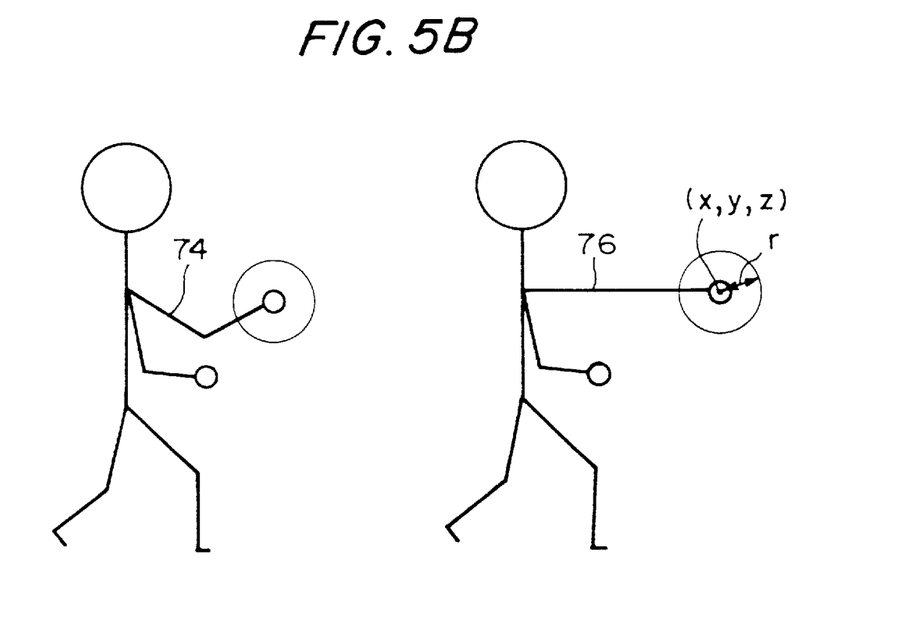

A flowchart used for illustrating the hit mark display processing is shown in FIG. 5A. First of all, it is determined whether or not an attack by the enemy's game character or player's game character has hit (step S1) and, if it has hit, the hit location is determined (step S2) and a hit mark is displayed at that hit location (step S3). With this embodiment, motion data for the game characters is previously prepared. If, for example, the player presses the punch button, motion data that has been prepared for a punch action is read and the game characters react in accordance with that motion data. For example, motions 74 and 76 in FIG. 5B are motions that occur in each frame during a punch action. Data representing the movements of joints or the like during the motions 74 and 76 is previously prepared as motion data and is stored in memory. A hit check and the hit location are specified by using this motion data. More specifically, the system determines whether or not a sphere defined by a radius r from position coordinates (x, y, z) of the fist of the game character intersects with the enemy's game character, and also specifies the hit check and hit location by obtaining the intersection position.

Figure 6:
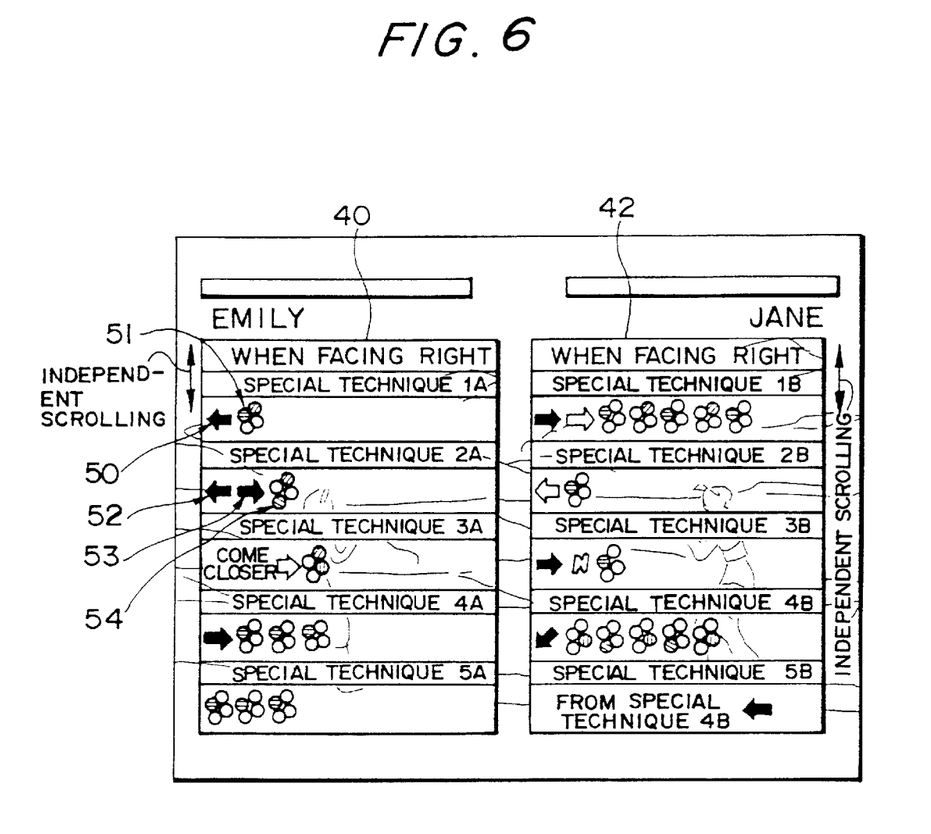
FIG. 6 illustrates lists of special techniques and the corresponding operating sequences.

Note that each of the game characters can exhibit their own individual special techniques, as shown in FIG. 6. In this case, operating sequence lists 40 and 42 shown in FIG. 6 represent operating sequences for producing special techniques that are possessed by the game characters 30 and 32. These operating sequence lists 40 and 42 are displayed by setting the operating sequence list mode to ON in the training menu screen of FIG. 3B. Each of these special techniques has individual data representing attack location. For example, the attack locations of a special technique 1A are the lower area and middle area, in sequence, so that data showing attacks on the lower area and middle area is comprised within the data representing that special technique 1A. It is therefore possible to display a hit mark at an attack position when a special technique has been unleashed, by using this data representing the corresponding attack location.

With this embodiment, details of operations that have been input by the player can be sequentially displayed by means of various identification symbols as shown by F in FIG. 1A, by setting the operating details display mode to ON in the training menu screen of FIG. 3B. This enables visual perception of the details of operations that have been input by the player, thus enabling an increase in the effectiveness of practice in training mode. This embodiment also displays whether the input operating sequence matches or does not match a reference sequence for unleashing a special technique.

Figure 2C:
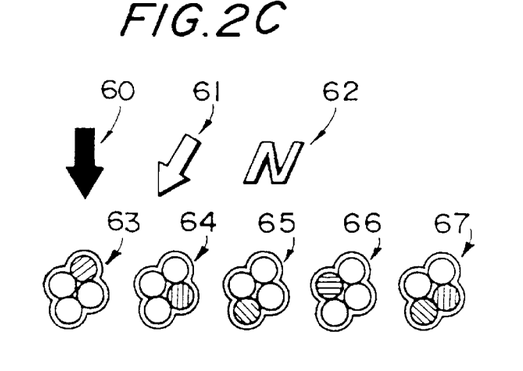

Various examples of identification symbols are shown in FIG. 2C. An identification symbol 60 represents the pressing of the operating button 14 which acts as a downward direction input means. Similarly, an identification symbol 61 represents the simultaneous press of the operating buttons 14 and 16, and this operation is equivalent to a direction input towards the lower left. Note that the identification symbols 60 and 61 are shown here as a black arrow and a white arrow, where the black arrow indicates the pressing of the operating button(s) for a long time and the white arrow indicates the pressing of the operating button(s) for a short time. An identification symbol 62 indicates the insertion of a given time interval between two input operations. With this embodiment, this time interval is, for example, an interval of one frame (1/60 seconds) to five frames. Therefore, the identification symbol 62 acts as a symbol requiring a time interval within a range of one to five frames, between one input operation and another input operation. Identification symbols 63, 64, 65, and 66 each indicate the pressing of the operating buttons 20, 22, 24, and 26. In this manner, operating details can be easily identified by displaying images similar to the button arrangement of the game controller. As is clear from comparison of these identification symbols, operating buttons having different dispositions on the game controller are displayed in mutually different colors with this embodiment. This makes it even easier to identify operations from the identification symbols. An identification symbol 67 indicates that the operating buttons 22 and 24 have both been pressed. In this manner, operations that define operating sequences include examples in which a plurality of operating buttons are pressed in combination.

A second characteristic of this embodiment will now be described. If the player selects replay mode while in training mode, and if a replay creation condition is satisfied or the player has performed a given manipulation, this second characteristic of the embodiment displays a replay image. An example of a replay image is shown in FIG. 1B. During replay, an image is displayed as seen from a viewpoint that differs from that of the game session.

Figure 7A:
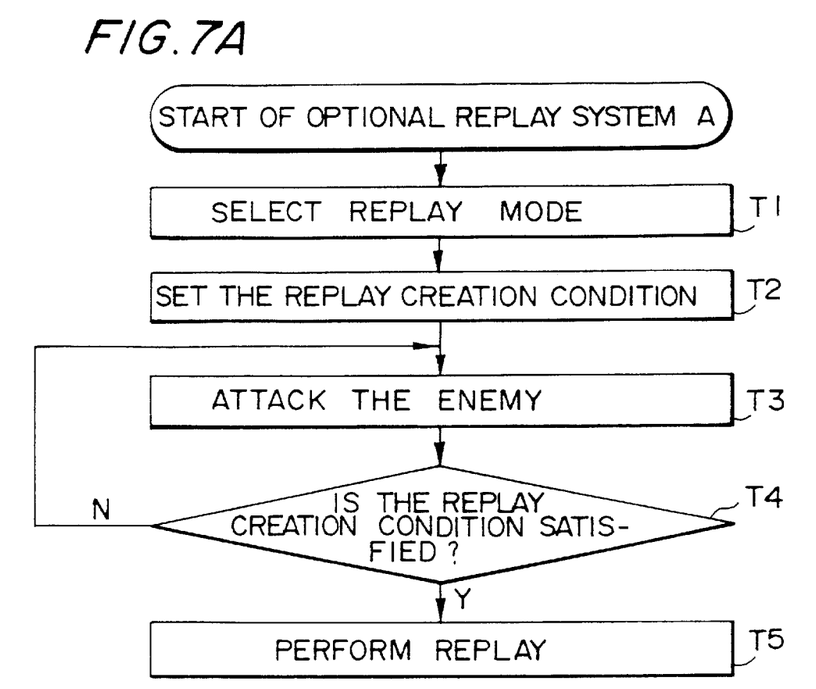
FIGS. 7A and 7B are flowcharts illustrating the replay processing.
Figure 7B:
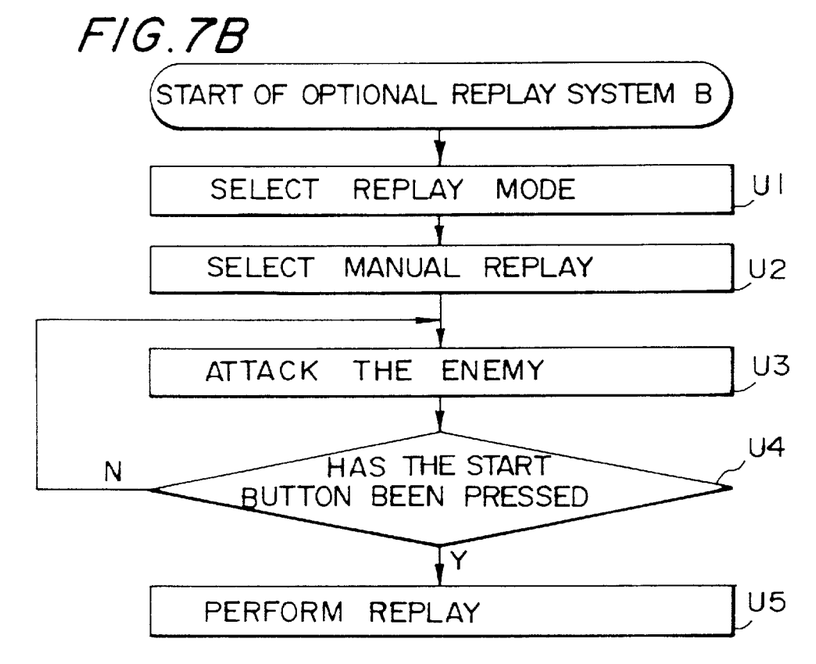

Flowcharts illustrating the processing that occurs in replay mode are shown in FIGS. 7A and 7B. With this embodiment, two types of replay are provided: replay A and replay B. With replay A, replay mode is first set to ON in the training menu screen of FIG. 3B (step T1). The replay creation condition is then set (step T2). Various different replay creation conditions could be considered. For example, the replay creation condition could be satisfied when the number of sequential attacks of the game character manipulated by the player exceeds a given number of times. This enables the use of replays as a means of allowing the player to experience the results achieved in training mode. The replay creation condition could also be satisfied when an operating sequence specified by at least one input operation input by the player matches a given reference, in other words, if the player is successful in unleashing a special technique. Since this enables a replay of a special technique unleashed by the player when the special technique is successful, it makes it possible to increase the player's feeling of satisfaction concerning the results in training mode, thus increasing the attraction of the training mode. If the player attacks the enemy (step T3) and, as a result, a replay creation condition is satisfied such as a sequence of attacks is successful or the special technique is successful (step T4), a replay image is displayed as shown in FIG. 1B.

The description now turns to replay B. Replay mode is first set to ON in the training menu screen of FIG. 3B (step U1), then manual replay is selected (step U2). In manual replay, a replay can be generated at any timing, without being restricted by the above described replay creation condition. In other words, replay occurs if the start button 28 shown in FIG. 2A is pressed (if a given manipulation is performed) while an attack is being performed on the enemy (steps U3, U4, and U5). This makes it possible to view the attacking performed within a certain period before the start button 28 was pressed. This replay B enables the player to see a replay at any time that the player wants.

Specific methods of implementing replays A and B will now be described. Replay data for enabling replay for a game character is stored in a replay buffer in main memory.

Figure 8A:
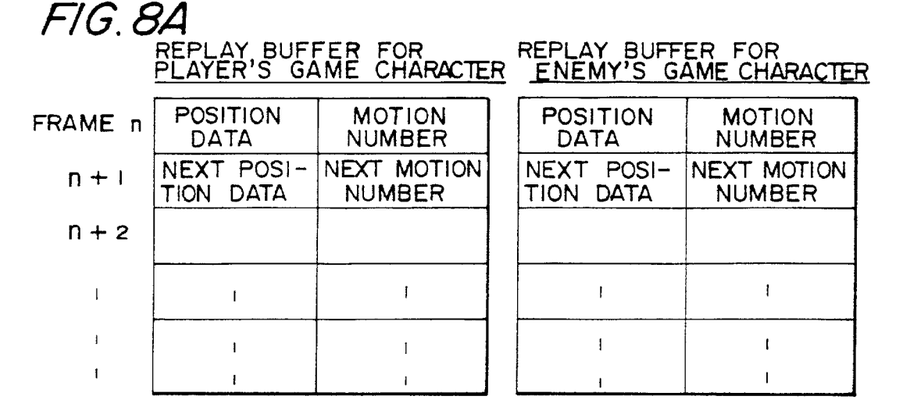
FIGS. 8A, 8B, and 8C are views illustrating the replay data and replay buffer.
Figure 8B:
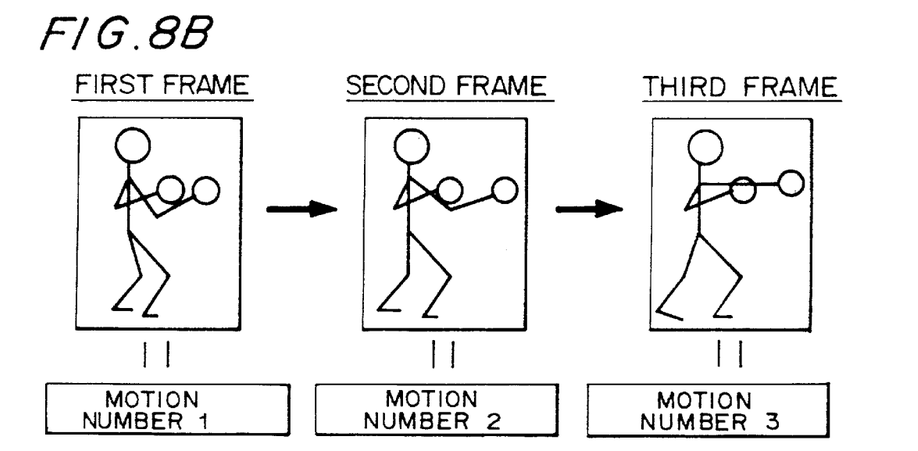

The structure of replay data stored in the replay buffer is shown in FIG. 8A. In this case, motion numbers are used for reading motion data for the game character from memory. Examples of the motions of a game character in single frames during a left-handed punch are shown in FIG. 8B; the motion data for performing these motions (data expressing factors such as the movements of joints) can be read out by motion numbers 1, 2, and 3. This motion data is defined in a local coordinate system, so that, in order to obtain the motions of the game character in an absolute coordinate system, it is necessary to obtain position data for the game character in the absolute coordinate system. That position data is as well stored in the replay buffer. To replay the actions of the game character manipulated by the player, the motion numbers and position data could be read out sequentially from the replay buffer for the player's game character. In other words, the movements of the game character within individual frames shown in FIG. 8B can be reproduced by reading out motion data in accordance with the above motion numbers and converting that motion data into the absolute coordinate system, using the position data. The actions of the enemy's game character can be replayed in the same way.

Figure 8C:
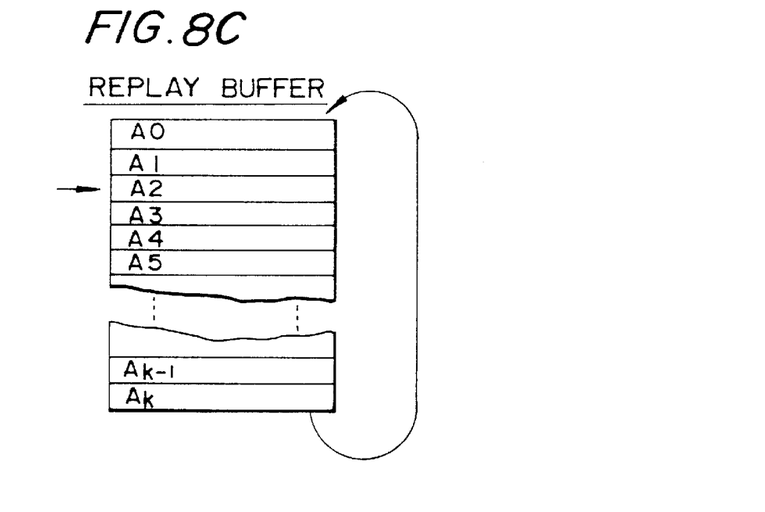

In replay mode, replay data is sequentially over-written to addresses A0, A1, . . . Ak from the top of the replay buffer, as shown in FIG. 8C. When replay data is written to address Ak, the cycle returns to the start and the next replay data is written to address A0.

If the start button 28 of FIG. 2A is pressed to activate replay B, the oldest replay data at that point is reproduced. If, for example, the last address at which replay data has been over-written is A2, the replay data is reproduced in the sequence of addresses A3, A4, . . . Ak, A1, A2, and the replay ends when the replay data at address A2 has been reproduced.

On the other hand, when replay A is activated, a given program searches for the address in the replay buffer at which the sequential attack started or the address at which the special technique started. If, for example, this address is A5, the reproduction of the replay data starts at that address A5 and reproduction of the replay data continues to the address at which the sequential attacks pause or the special technique ends.

A third characteristic of this embodiment will now be described. When a counterattack mode is selected in training mode, this third characteristic of the embodiment causes an attack against the player's game character by the game character manipulated by the computer. This makes it possible for the player to practice counterattacking efficiently. A game image during a counterattack is shown in FIG. 1C. In FIG. 1C, the player's game character 30 counterattacks against the attack of the enemy's game character 32.

Figure 9:
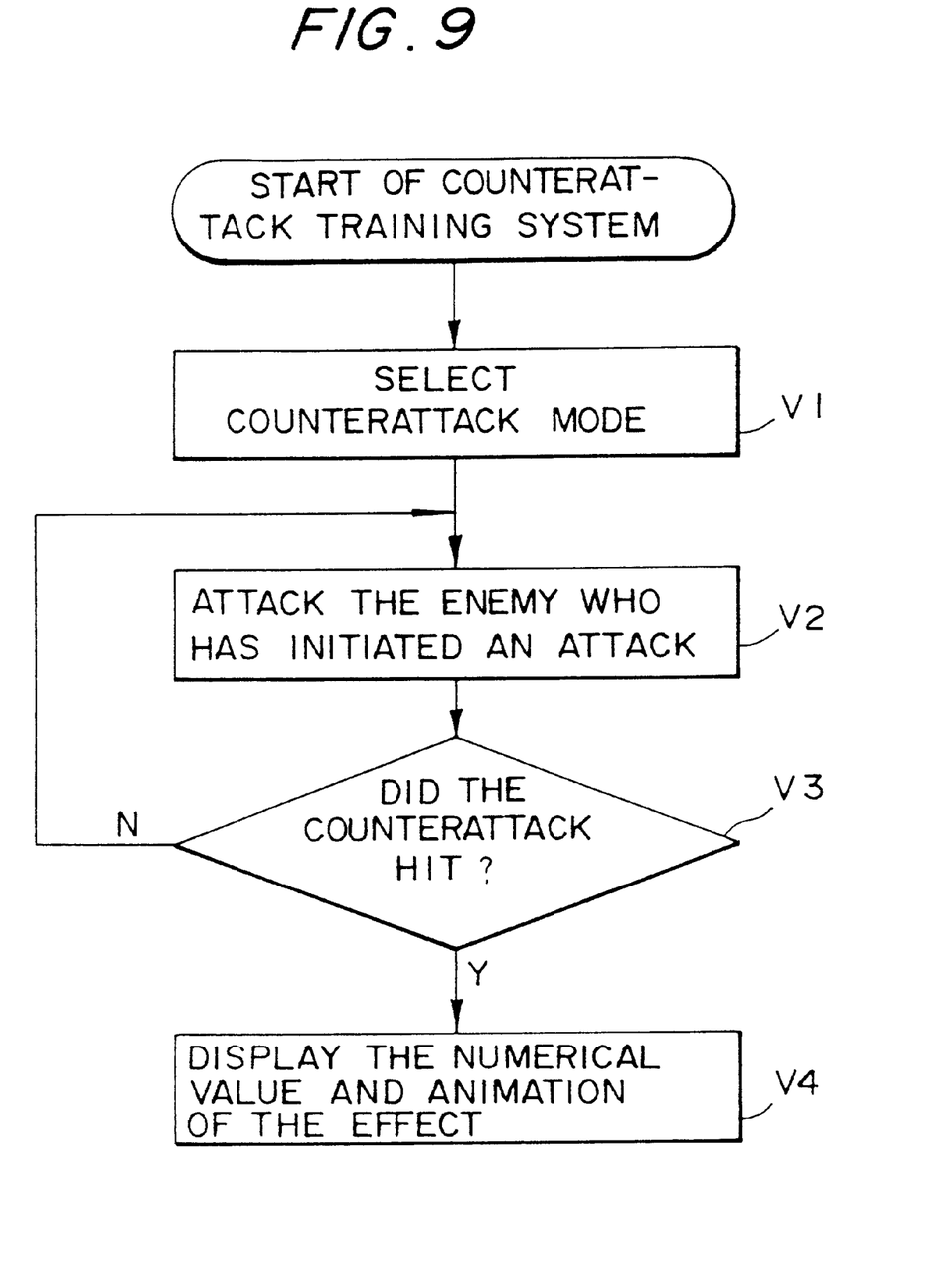
FIG. 9 shows a flowchart illustrating the counterattack processing.

A flowchart used for illustrating the processing in counterattack mode is shown in FIG. 9. First of all, counterattack mode is set to ON (i.e., the counterattack ON mode is selected) in the training menu screen of FIG. 3B (see step V1 of FIG. 9) to cause an attack by the enemy game character manipulated by the computer, so that the player can manipulate the player's game character to counterattack (step V2). When the counterattack mode is set to off (i.e., the counterattack OFF mode is selected) the enemy game character manipulated by the computer does not attack. If the counterattack is successful (step V3), a game image indicating that the counterattack has been successful is displayed, and also other details such as the damage inflicted upon the enemy by the counterattack is displayed, as shown by G in FIG. 1C (step V4).

If the enemy's game character unleashes a technique, a technique-unleashing flag is set within memory. If the attack of the player's game character hits the enemy's game character when this technique-unleashing flag is set, the amount of damage to the enemy's game character is increased by:

amount of damage=normal amount of damage×1.2

To inform the player of this fact, a display such as that of G in FIG. 1C appears. Since it is possible to inflict a great deal of damage on the enemy if such a counterattack is successful, the quality of counterattack skills becomes an important factor in determining the result of the game. In normal combat mode, the timing at which an enemy's game character initiates an attack is not constant, so it is difficult to practice counterattacks. In the counterattack mode of this embodiment, the enemy's game character initiates attacks at a constant timing, thus enabling effective practice of counterattacks.

Figure 10:
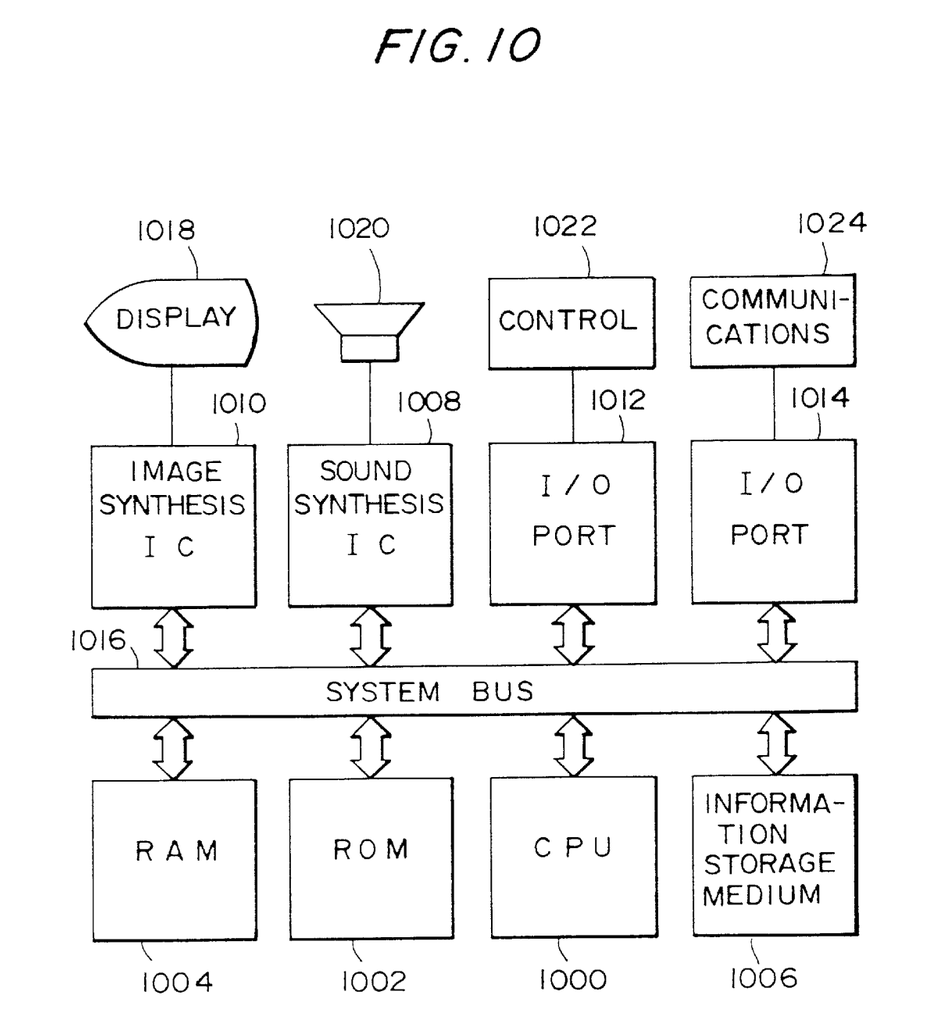
FIG. 10 shows an example of the configuration of games machine hardware that can be implemented by this embodiment.

A configurational example of the hardware of a games machine that enables the implementation of this embodiment will now be described, with reference to FIG. 10. In the games machine shown in this figure, a CPU 1000, ROM 1002, RAM 1004, information storage medium 1006, sound synthesis IC 1008, image synthesis IC 1010, and I/O ports 1012 and 1014 are connected together by a system bus 1016 so that data can be transferred therebetween. A display 1018 is connected to the image synthesis IC 1010, a speaker 1020 is connected to the sound synthesis IC 1008, a control device 1022 is connected to the I/O port 1012, and a communications device 1024 is connected to the I/O port 1014.

Image information or the like for representing a game program and display objects is mainly stored in the information storage medium 1006, and a CD-ROM, game cassette, DVD, IC card, MO disk, floppy disk, or memory is used therefor. Means such as a CD-ROM, game cassette, or DVD could be used as an information storage medium for storing a game program for a domestic games machine, for example. Memory such as ROM could be used for an arcade games machine, in which case the information storage medium 1006 becomes the ROM 1002.

The control device 1022 is equivalent to the game controller and it is used as a device for inputting into the main unit of the games machine the effects of decisions made by the player as the game progresses.

The CPU 1000 controls the entire apparatus and processes data in accordance with a game program stored in the information storage medium 1006, a system program stored in the ROM 1002, and signals input through the control device 1022. The RAM 1004 is a storage means that is used as a work space for the CPU 1000, and given details from the information storage medium 1006 or the ROM 1002, or the results of computations by the CPU 1000, are stored therein. The data structure having the logical configuration of data such as the replay and motion data of FIGS. 8A and 8B is built into this RAM.

The provision of the sound synthesis IC 1008 and the image synthesis IC 1010 in this type of games machine makes it possible to output game sounds and game images. The sound synthesis IC 1008 is an integrated circuit that synthesizes game sounds such as sound effects and background music, based on information stored in the information storage medium 1006 or the ROM 1002, and the thus synthesized game sounds are output by the speaker 1020. The image synthesis IC 1010 is an integrated circuit that synthesizes pixel information for output to the display 1018, based on image information that is sent from components such as the RAM 1004, the ROM 1002, and the information storage medium 1006. Note that a device called a head-mounted display (HMD) could be used as the display 1018.

The communications device 1024 is designed to transfer various types of information used within the games machine to and from external devices, and it is used to transfer given information in accordance with a game program to and from another games machine connected thereto, or transfer information such as a game program through a communication line.

The image synthesis processing described with reference to FIGS. 1A to 1C, 3A, 3B, and 4A to 4C is implemented by components such as the information storage medium 1006 that contains a game program for performing processing such as that shown in the flowcharts of FIGS. 5A, 7A, 7B, and FIG. 9, the CPU 1000 that operates in accordance with the game program, the image synthesis IC 1010, and the sound synthesis IC. Note that the processing performed by the image synthesis IC 1010 and the sound synthesis IC 1008 could be performed in a software manner by means such as the CPU 1000 or an ordinary digital signal processor (DSP).

Figures 11A, 11B:
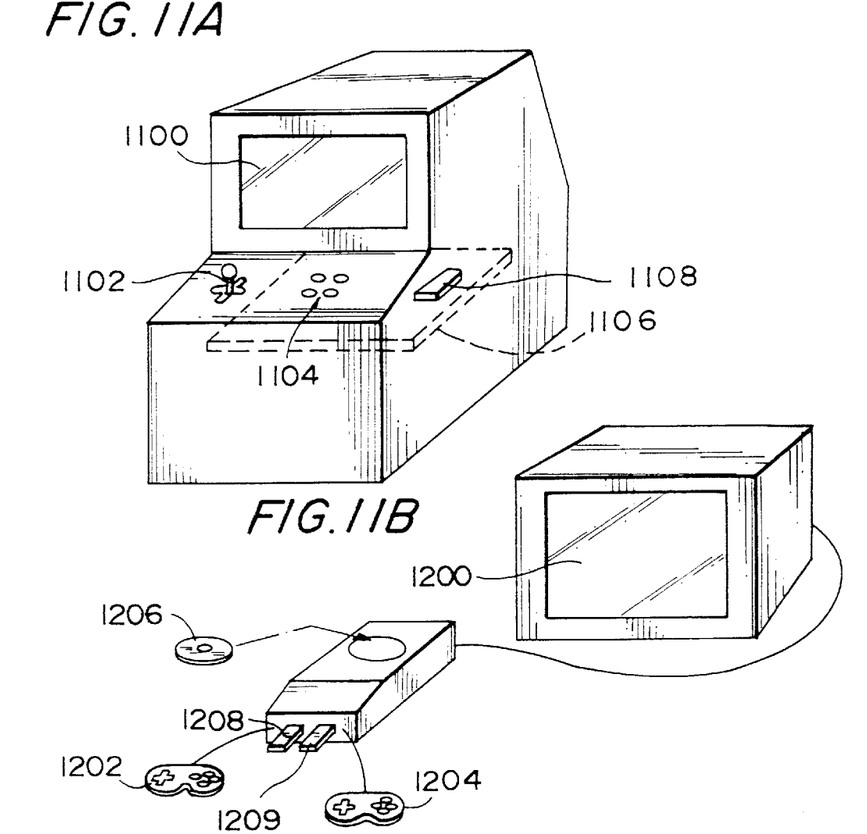
FIGS. 11A, 11B, and 11C show devices of various different forms to which this embodiment is applied.

An example of this embodiment applied to an arcade games machine is shown in FIG. 11A. A player enjoys the game by operating a joystick 1102 and buttons 1104, while viewing a game image projected onto a display 1100. Components such as a CPU, image synthesis IC, and sound synthesis IC are mounted on an IC board 1106 built into the apparatus. A memory 1108 is an information storage medium mounted on the IC board 1106. Information that is stored in the memory 1108 includes information for displaying an image of combat between a game character manipulated by a player and a game character manipulated by a computer, when a training mode is selected in order to enable the player to practice manipulations with a game controller; information for displaying an image indicating a hit mark at a hit location, when an attack by one of the game characters hits the other game character; information for displaying a replay image relating to an attack by the game character manipulated by the player against the game character manipulated by the computer, when the player selects a replay mode while in this training mode and when the attack by the game character manipulated by the player against the game character manipulated by the computer satisfies a given replay creation condition; information for displaying a replay image relating to actions performed by the game character manipulated by the player and the game character manipulated by the computer before a given manipulation, when the player selects a replay mode while in the training mode and the player performs the given manipulation; and information for displaying an image of an attack action performed by the game character manipulated by the computer, when the player selects a counterattack mode while in this training mode. This information is hereinafter called stored information. This stored information comprises at least one type of information, such as program coding for performing the above described processing, image information, sound information, shape information for display objects, table data, list data, or player information.

An example of this embodiment applied to a domestic games machine is shown in FIG. 11B. Players enjoy the game by operating game controllers 1202 and 1204 while viewing a game image that is projected onto a display 1200. In this case, the above described stored information is stored in a CD-ROM 1206 or IC cards 1208 and 1209 or the like, which is an information storage medium that can be freely inserted into and removed from the main unit.

Figure 11C:
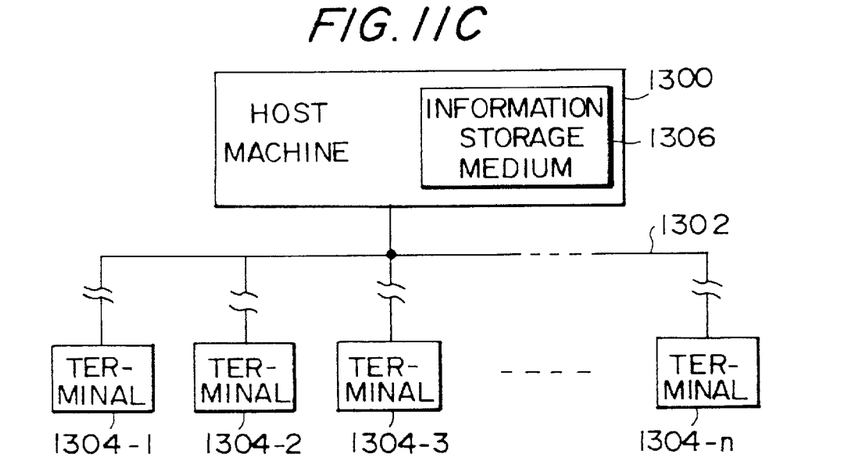

Another example of this embodiment applied to a games machine is shown in FIG. 11C, where the games machine comprises a host machine 1300 and terminals 1304-1 to 1304-n connected to the host machine 1300 by a communication line 1302. In this case, the above described stored information is stored in an information storage medium 1306 such as a magnetic disk, magnetic tape, or memory that can be controlled by the host machine 1300. If each of the terminals 1304-1 to 1304-n has a CPU, an image synthesis IC, and a sound synthesis IC so that game images and sounds can be synthesized thereby in a stand-alone manner, means such as a game program for synthesizing game images and sounds is transferred from the host machine 1300. On the other hand, if they cannot be synthesized in a stand-alone manner, the configuration is such that the host machine 1300 creates the game images and sounds then transfers them to the terminals 1304-1 to 1304-n for output by those terminals.

Note that this invention is not limited to the embodiments thereof described above and thus it can be implemented in many various ways.

For example, the form of hit marks is not limited to that described with respect to the above embodiment, and various other forms could be envisioned to make it easy for the player to perceive hit locations. Similarly, various conditions other than the replay creation conditions described with respect to this embodiment could equally well be considered.

This invention can also be applied to games other than fighting games, and the game characters of this invention comprise various other entities such as representations of human beings, robots, or tanks.

This invention can not only be applied to a domestic or arcade games machine, it can also be applied to various other kinds of games machines such as simulators, large games machines for an attraction where many players can participate, personal computers, multimedia terminals, and IC boards that synthesize games images.

What is claimed is:

1. A method for training a player, comprising:

displaying an image of combat between a game character manipulated by a player and a game character manipulated by a computer, enabling the player to practice manipulations with a game controller in a selected training mode; and displaying an image indicating a hit mark at a hit location, when an attack by one of the game characters hits the other game character, wherein the training mode includes at least one of a counterattack ON mode, where the game character controlled by the computer attacks on command, and a counterattack OFF mode, where the game character controlled by the computer does not attack.

2. The method of claim 1, wherein:

said hit mark comprises a symbol for identifying the hit location.

3. The method of claim 1, wherein:

a guard mark is displayed when said other game character defends against said attack.

4. The method of claim 1, wherein:

when said attack hits an upper area, middle area, or lower area of said other game character, a hit mark specifying that upper area, middle area, or lower area is displayed.

5. A method for training a player, comprising:

displaying an image of combat between a game character manipulated by a player and a game character manipulated by a computer, enabling the player to practice manipulations with a game controller in a selected training mode; and displaying a replay image relating to an attack by the game character manipulated by the player against the game character manipulated by the computer when selecting a replay mode while in said training mode and when said attack by the game character manipulated by the player against the game character manipulated by the computer satisfies a given replay creation condition, wherein the training mode includes at least one of a counterattack ON mode, where the game character controlled by the computer attacks on command, and a counterattack OFF mode, where the game character controlled by the computer does not attack.

6. The method of claim 5, wherein:

satisfying said replay creation condition occurs when a number of sequential attacks of the game character manipulated by the player exceeds a given number of times.

7. The method of claim 5, wherein:

satisfying said replay creation condition occurs when an operating sequence specified by at least one input operation input by the player matches a given reference sequence.

8. A method for training a player comprising:

displaying an image of combat between a game character manipulated by a player and a game character manipulated by a computer;

enabling the player to practice manipulations with a game controller in a selected training mode; and displaying a replay image relating to actions performed by the game character manipulated by the player and the game character manipulated by the computer when the player selects a replay mode while in this training mode and the player performs a given manipulation, the replay image relating to the actions performed by the game characters prior to the given manipulation, wherein the training mode includes at least one of a counterattack ON mode, where the game character controlled by the computer attacks on command, and a counterattack OFF mode, where the game character controlled by the computer does not attack.

9. A games machine that trains a player, comprising:

means for displaying an image of combat between a game character manipulated by a player and a game character manipulated by a computer;

means for enabling the player to practice manipulations with a game controller in a selected training mode; and means for displaying an image indicating a hit mark at a hit location, when an attack by one of the game characters hits the other game character, wherein the training mode includes at least one of a counterattack ON mode, where the game character controlled by the computer attacks on command, and a counterattack OFF mode, where the game character controlled by the computer does not attack.

10. A games machine for training a player comprising:

means for displaying an image of combat between a game character manipulated by a player and a game character manipulated by a computer enabling the player to practice manipulations with a game controller in a selected training mode; and means for displaying a replay image relating to an attack by the game character, manipulated by the player against the game character manipulated by the computer when the player selects a replay mode while in said training mode and when said attack by the game character manipulated by the player against the game character manipulated by the computer satisfies a given replay creation condition, wherein the training mode includes at least one of a counterattack ON mode, where the game character controlled by the computer attacks on command, and a counterattack OFF mode, where the game character controlled by the computer does not attack.

11. A games machine for training a player, comprising:

means for displaying an image of combat between a game character manipulated by a player and a game character manipulated by a computer enabling the player to practice manipulations with a game controller in a selected training mode; and means for displaying a replay image relating to actions performed by the game character manipulated by the player and the game character manipulated by the computer when the player selects a replay mode while in this training mode and the player performs a given manipulation, the replay image relating to the actions performed by the game characters prior to the given manipulation, wherein the training mode includes at least one of a counterattack ON mode, where the game character controlled by the computer attacks on command, and a counterattack OFF mode, where the game character controlled by the computer does not attack.

12. An information storage medium for training a player, comprising:

information for displaying an image of combat between a game character manipulated by a computer;

information enabling the player to practice manipulations with a game controller in a selected training mode; and information for displaying an image indicating a hit mark at a hit location, when an attack by one of the game characters hits the other game character, wherein the training mode includes at least one of a counterattack ON mode, where the game character controlled by the computer attacks on command, and a counterattack OFF mode, where the game character controlled by the computer does not attack.

13. An information storage medium for training a player, comprising:

information for displaying an image of combat between a game character manipulated by a player and a game character manipulated by a computer;

information for enabling the player to practice manipulations with a game controller in a selected training mode; and information for displaying a replay image relating to an attack by the game character manipulated by the player against the game character manipulated by the computer when the player selects a replay mode while in said training mode and when said attack by the game character manipulated by the player against the game character manipulated by the computer satisfies a given replay creation condition, wherein the training mode includes at least one of a counterattack ON mode, where the game character controlled by the computer attacks on command, and a counterattack OFF mode, where the game character controlled by the computer does not attack.

14. An information storage medium for, training a player, comprising:
- information for displaying an image of combat between a game character manipulated by a player and a game character manipulated by a computer;
- information enabling the player to practice manipulations with a game controller in a selected training mode; and
- information for displaying a replay image relating to actions performed by the game character manipulated by the player and the game character manipulated by the computer when selecting a replay mode while in this training mode and the player performs a given manipulation, the replay image relating to the actions performed by the game characters prior to the given manipulation, wherein the training mode includes at least one of a counterattack ON mode, where the game character controlled by the computer attacks on command, and a counterattack OFF mode, where the game character controlled by the computer does not attack.

* * * * *